United States Patent [19]

Nopper et al.

[11] 3,968,296

[45] July 6, 1976

[54] PRESSURE COMPENSATOR FOR HEATING PLATEN PRESSES

[75] Inventors: Herbert Nopper; Wolfgang Knoch, both of Krefeld, Germany

[73] Assignee: Becker & van Hullen Niederrheinische Maschinenfabrik, Krefeld, Germany

[22] Filed: Apr. 18, 1974

[21] Appl. No.: 462,083

[30] Foreign Application Priority Data

Apr. 18, 1974 Germany............................ 2319593

[52] U.S. Cl. .............................. 428/256; 100/93 P; 100/297; 156/583; 432/239; 432/253

[51] Int. Cl.$^{2}$ .......................................... B32B 31/20

[58] Field of Search ............ 156/583; 100/295, 297, 100/93 P; 428/256; 432/239, 253

[56] References Cited

UNITED STATES PATENTS

| | | | |
|---|---|---|---|
| 2,770,026 | 11/1956 | Petensilie et al. | 428/256 |
| 3,017,315 | 1/1962 | Doyle | 156/583 |
| 3,096,545 | 7/1963 | Rowland | 100/297 |
| 3,297,461 | 1/1967 | Siddall | 428/256 |
| 3,387,333 | 6/1968 | Irvine et al. | 156/583 |
| 3,493,451 | 2/1970 | Berry | 156/583 |
| 3,684,640 | 8/1972 | Hillers | 156/380 |

*Primary Examiner*—Edward G. Whitby
*Attorney, Agent, or Firm*—Herbert E. Kidder

[57] ABSTRACT

A resilient thermally-conductive pressure compensator for use in heating plate presses used to manufacture coated wood panels or boards, comprising a composite sheet consisting of a woven mesh of metal wires embedded in a matrix of a heat conducting elastomeric filler material.

6 Claims, 4 Drawing Figures

PRESSURE COMPENSATOR FOR HEATING PLATEN PRESSES

This invention relates to a pressure compensator for heating plate presses for the manufacture of laminated compound plates, laminates of any kind, multi-layer plastic foils, and in particular for the coating of wood material boards, such as veneer boards, fiber boards, plywood boards, carpenter's boards with synthetic resin films glued dry or wet with application of pressure and heat.

Pressure compensators have the function of equalizing unevenness within the plate products and inaccuracies in the compressed space, so that the required compressive pressure is substantially equal at all points over the product surface and thereby a uniform finished product surface is obtained. More particularly, this is necessary when the product surface is to be made with a high degree of gloss. The pressure compensators are normally arranged between at least one heating plate and one pressing sheet applying against the plate product to be manufactured. Regardless of their function to equalize unevennesses, therefore, the pressure compensators must be made of a material which propagates heat especially well.

The known pressure compensators consist as a rule of textile or asbestos fabrics with or without woven-in metal wires, kraft papers in several layers, as for example, soda kraft paper, or of rubber mats which have been produced from temperature-stable rubber mixtures. The disadvantage of these known pressure compensators essentially consists in that the required thermal conductivity is too low and as a result they constitute a kind of heat brake. Thus there results for the heating plate presses a considerable power loss, as the required temperature can be reached at the plate product only after the poor thermal conductivity has been overcome.

The object underlying the invention is to provide a pressure compensator having a much better thermal conductivity. The solution of this problem consists in that the pressure compensator is made of a metal cloth mesh fabric, the mesh openings of which are filled with a heat-conductive filler material.

This combination offers major advantages compared with the known compensators on asbestos textile or rubber bases or compared with the unfilled metal mesh fabric alone. On the one hand the metal mesh fabric serves as supporting fabric for the heat-conducting material, further as strength carrier and additionally as thermal-conductivity carrier via the mesh wires. On the other hand, the heat-conducting filler material eliminates the heat-insulating effect of the mesh openings which exists, with the use of normal mesh fabrics, due to the air in the mesh openings.

According to another feature of the invention, the metal mesh fabric consists of multi-twisted weft and warp filaments. Preferably phosphor bronze or brass is used as material.

Additionally, it has proved advantageous to use metal mesh fabrics of a maximum thickness of 1.3 mm and a minimum of 0.5 mm, preferably between 0.8 and 1 mm thickness.

According to the invention, the heat-conducting filler material for the mesh openings consists in especially advantageous use of silicone rubber. Silicone rubber has the advantage that from about 140°C on up it has an increasing thermal conductivity. Further, silicone rubber can be cured or vulcanized, so that a good durable bond with the metal mesh fabric can be attained. The pressure stability of silicone rubber, which is not high in itself, is compensated by the metal mesh fabric as supporting fabric.

A further advantage of the invention is in the use of silicone rubber of a type which does not depolymerize under exclusion of air and under high temperatures.

According to another feature of the invention, it is provided that additives of still higher thermal conductivity are admixed with the heat-conducting filler material. Thereby the thermal conductivity of the filler material is further improved. Appropriately, the percentage of the additives is between 25 and 75% of the total filler composition, preferably about 50%.

Suitable additives are copper and/or aluminum and/or aluminum bronze and/or graphite and/or ferrosilicon powders. These additives, in particular for the extremely favorable silicone rubber, have the advantage that they supply a good inner bond and strength of the filler composition and a high affinity to the metal mesh fabric is preserved. If the additives are ground fine, this affinity is insured even in increased degree. Besides, it has been found that a mixture of copper and aluminum powder in the ratio 50:16% in the total mixture of the filler materials gives an optimum result.

In the following, some mixture examples for the filler material are listed:

Example 1:
16% by weight of aluminum powder
50% by weight of copper powder
34% silicone rubber fully vulcanized Example 2:
23% by weight of aluminum powder
33% by weight of copper powder
11% graphite powder
33% silicone rubber fully vulcanized Example 3:
25% aluminum powder
25% copper powder
50% silicone rubber fully vulcanized Example 4:
54% aluminum powder
46% silicone rubber fully vulcanized Example 5:
60% by weight of copper powder
40% by weight silicone rubber fully vulcanized Example 6:
55% by weight ferrosilicon powder
45% silicone rubber fully vulcanized Example 7:
30% by weight of aluminum bronze powder
70% by weight of silicone rubber fully vulcanized The advantages of the pressure compensator according to the present invention over the known pressure compensators may be summarized as follows:

a. Better pressure compensation due to the improved elasticity obtained over the filler material.
b. Long service life due to the high pressure stability through the use of a metal mesh fabric as support fabric.
c. Substantially better thermal conductivity and consequently a power (or output) gain of the heating-plate press with simultaneously excellent surface quality of the plate products.
d. High strength and resistance to mechanical influences, thereby causing an excellent transport and handling ability without disadvantageous contraction and expansion stresses.

e. Very high temperature stability without danger of depolymerization up to 300°C.

DESCRIPTION OF PREFERRED EMBODIMENT

Figure 1:
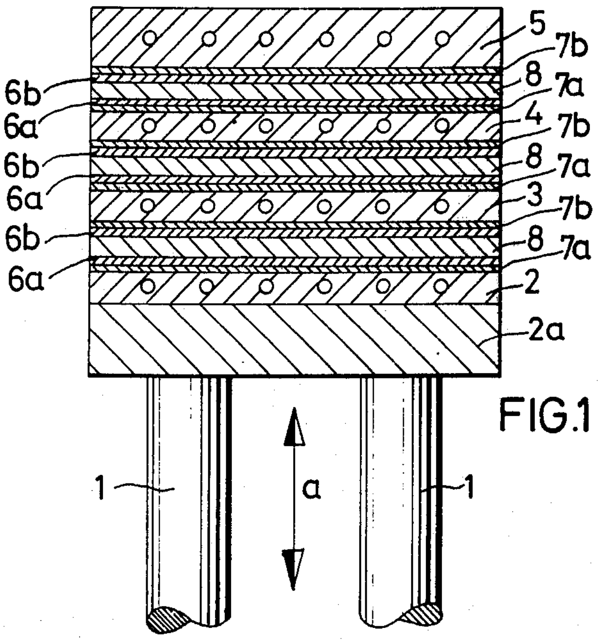
FIG. 1 is a schematic vertical section, taken through a multi-bed press, showing pressure compensators disposed on opposite sides of each of the panels being pressed.

According to FIG. 1, a multi-bed horizontal press consists of press pistons liftable and lowerable in the direction of the arrow *a*, and of heating plates 2, 3, 4 and 5. The lower heating plate 2 is firmly connected with the press piston 1 via a crossbeam 2*a*, while the upper heating plare 5 is fixedly mounted. The heating plates 3 and 4 are liftable and lowerable like heating plate 2.

Between the heating plates 2, 3, 4, 5 the product to be pressed 8 is arranged with interposition of lower and upper press sheets 6*a*, 6*b* for each and the pressure compensators 7*a*, 7*b* according to the invention.

Figure 2:
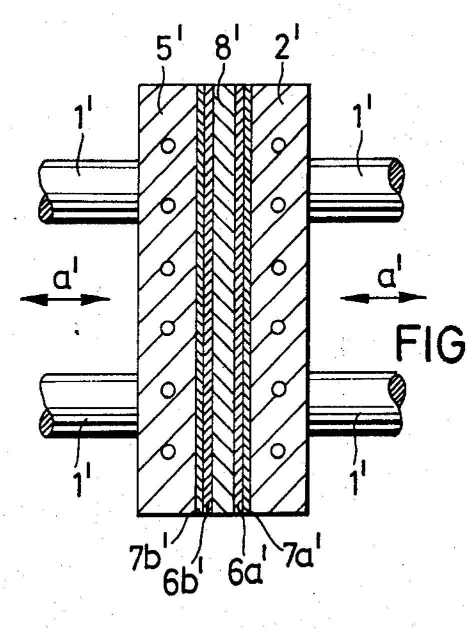
FIG. 2 is a similar view of a single-bed vertical press.

A similar construction applies to the single bed vertical press shown in FIG. 2, the two heating plates 2' and 5' being movable relative to each other in the direction of the arrows *a'* by pistons 1'. The press sheets bear the reference numbers 6*a'* and 6*b'*, and the pressure compensators the reference numbers 7*a'* and 7*b'*. The product to be pressed is marked 8'.

Figure 3:
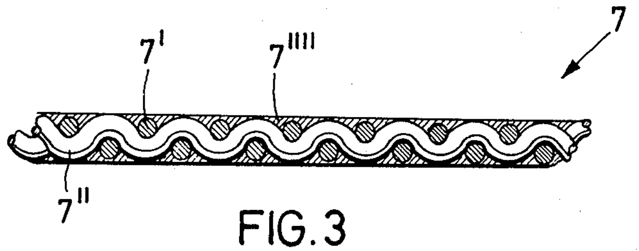
FIG. 3 is an enlarged fragmentary sectional view through a pressure compensator embodying the invention.
Figure 4:
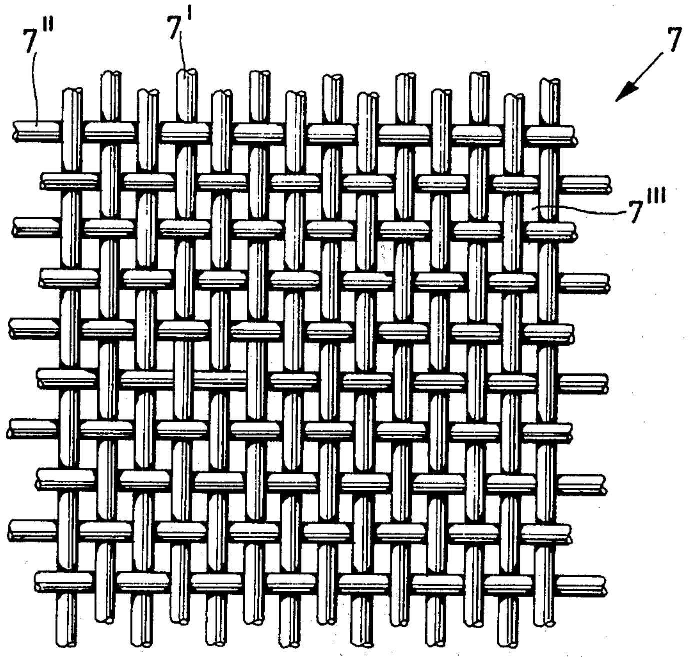
FIG. 4 is a top plan view of the pressure compensator shown in FIG. 3.

In FIGS. 3 and 4, the pressure compensator 7 is shown on a larger scale, consisting of a metal mesh fabric with the weft filaments 7' and the warp filaments 7'', the mesh openings 7''' being filled with a heat-conducting filler material 7''''. The filler material 7'''' is not shown in FIG. 4. The filler material 7'''' may consist of any one of the mixtures given in Examples 1–7, inclusive, or the metal powders may be varied from the percentages shown. Weft filaments 7' and warp filaments 7'' are preferably made of phosphor bronze or brass.

What we claim is:

1. A resilient, thermally-conductive pressure compensator for use in heating-plate presses of the type used to manufacture coated wood material panels or boards, comprising a composite sheet consisting of a woven mesh of metal wires embedded in a matrix of heat-conducting elastomeric filler material consisting of silicone rubber, said elastomeris material completely surrounding the metal wires and filling the interstices between them, and the elastomeric material being bonded to the metal wires, and having plane surfaces on opposite sides of the sheet substantially flush with the outer surfaces of the wire mesh.

2. Pressure compensator according to claim 1, characterized in that additives of higher thermal conductivity are admixed to the heat-conducting filler material.

3. Pressure compensator according to claim 2, characterized in that the percentage of the additives is between 25 and 75% of the total filler material.

4. Pressure compensator according to claim 2, characterized in that the additives consist of material selected from the group consisting of copper, aluminum, aluminum bronze, graphite, ferrosilicon powders, and mixtures thereof.

5. Pressure compensator according to claim 4, characterized in that the additives consist of a mixture of copper and aluminum powder in the ratio 50:16% in the total mixture.

6. Pressure compensator according to claim 2, characterized in that the powder additives are ground extremely fine.

* * * * *